US012692907B2

(12) United States Patent
Orel et al.

(10) Patent No.: US 12,692,907 B2
(45) Date of Patent: Jul. 28, 2026

(54) CLUTCH ASSEMBLY COMPRISING RADIALLY DISPLACEABLE CONTROL MEMBERS, AND DRIVE TRAIN COMPRISING THE CLUTCH ASSEMBLY

(71) Applicant: Schaeffler Technologies AG & Co. KG, Herzogenaurach (DE)

(72) Inventors: Erik Orel, Skalica (SK); Luboslav Slezák, Podbranc (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 33 days.

(21) Appl. No.: 18/851,074

(22) PCT Filed: Feb. 9, 2023

(86) PCT No.: PCT/DE2023/100105
§ 371 (c)(1),
(2) Date: Sep. 26, 2024

(87) PCT Pub. No.: WO2023/186200
PCT Pub. Date: Oct. 5, 2023

(65) Prior Publication Data
US 2025/0188996 A1 Jun. 12, 2025

(30) Foreign Application Priority Data
Mar. 28, 2022 (DE) ...................... 10 2022 107 288.6

(51) Int. Cl.
*F16D 11/14* (2006.01)
*F16D 41/04* (2006.01)
*F16D 11/00* (2006.01)

(52) U.S. Cl.
CPC .............. *F16D 11/14* (2013.01); *F16D 41/04* (2013.01); *F16D 2011/002* (2013.01)

(58) Field of Classification Search
CPC .......... F16D 41/10; F16D 41/12; F16D 41/08; F16D 41/069; F16D 2011/002
See application file for complete search history.

(56) References Cited

U.S. PATENT DOCUMENTS

| | | | |
|---|---|---|---|
| 10,520,046 B2 * | 12/2019 | Peglowski | .............. F16D 41/14 |
| 2007/0278061 A1 | 12/2007 | Wittkopp et al. | |
| 2008/0185253 A1 | 8/2008 | Kimes | |
| 2009/0145718 A1 | 6/2009 | Chiesa et al. | |

(Continued)

FOREIGN PATENT DOCUMENTS

| | | |
|---|---|---|
| DE | 1805849 A1 | 6/1970 |
| DE | 2757739 A1 | 5/1979 |

(Continued)

*Primary Examiner* — Stacey A Fluhart

(57) ABSTRACT

A clutch assembly includes a main rotational axis, a first clutch partner and a second clutch partner, a plurality of control members and a slider sleeve. The plurality of control members are arranged to control a coupling device, and the coupling device arranged to couple the first clutch partner and the second clutch partner. The slider sleeve is coaxially displaceable with respect to the first clutch partner and the second clutch partner to actuate the plurality of control members. The plurality of control members is arranged on a radial inside of the slider sleeve and displaceable in a radial direction relative to the main rotational axis.

18 Claims, 6 Drawing Sheets

(56)                  References Cited

U.S. PATENT DOCUMENTS

2009/0266667  A1    10/2009  Samie et al.
2010/0140041  A1     6/2010  Wittkopp et al.
2011/0290608  A1    12/2011  Bird
2017/0138416  A1*    5/2017  Lee ......................... F16D 23/14
2018/0231063  A1*    8/2018  Littlefield ............... F16D 11/16
2022/0260121  A1*    8/2022  Sato ...................... F16D 27/108
2022/0397164  A1    12/2022  Geiser et al.
2025/0043833  A1     2/2025  Orel

FOREIGN PATENT DOCUMENTS

DE      102007024839  A1     1/2008
DE      102015120818  A1     6/2017
DE      102020121868  A1     2/2021

* cited by examiner 1,105

CLUTCH ASSEMBLY COMPRISING RADIALLY DISPLACEABLE CONTROL MEMBERS, AND DRIVE TRAIN COMPRISING THE CLUTCH ASSEMBLY

CROSS-REFERENCE TO RELATED APPLICATIONS

This application is the United States National Phase of PCT Appln. No. PCT/DE2023/100105 filed Feb. 9, 2023, which claims priority to German Application No. DE102022107288.6 filed Mar. 28, 2022, the entire disclosures of which are incorporated by reference herein.

TECHNICAL FIELD

The present disclosure relates to a clutch assembly. The disclosure also relates to a drive train including the clutch assembly.

BACKGROUND

Clutches are used in vehicles to open and close as well as to connect torque paths of the drive. Frictional and interlocking clutches are used for this. In some applications, freewheels are also used to transmit torque according to the rotational direction.

Document DE10 2007 024 839 A1 shows a selectable one-way rocker clutch assembly with an inner race arranged radially inside an outer race, a first and a second plurality of rockers, a selector ring and a pressure plate. The inner race defines a plurality of pockets configured to effectively retain the first plurality and the second plurality of rockers. The first plurality of rockers are configured to resist rotation of the outer race relative to the inner race in a first direction. The second plurality of rockers are configured to resist rotation of the outer race relative to the inner race in a second direction. The selector ring is arranged radially between the inner race and the outer race. The pressure plate is configured to engage the selector ring and, in so doing, to rotate the selector ring so as to thereby selectively retract the first and/or second plurality of rockers and thereby control the state of the rocker clutch assembly.

SUMMARY

The present disclosure provides a clutch assembly which is designed and/or is suitable for a drive train of a vehicle. The clutch assembly is used, for example, to connect or disconnect a drive axle of the vehicle.

The clutch assembly has a first clutch partner and a second clutch partner. The clutch partners may be rotated about a common main rotational axis. The first clutch partner can be and/or is connected in a torque-transmitting manner to a first rotating component, for example a first shaft, and the second clutch partner can be and/or is connected in a torque-transmitting manner to a second rotating component, for example a second shaft. The two clutch partners may be arranged coaxially and/or concentrically to one another with respect to the main rotational axis. For example, the first clutch partner is designed as a hub and/or the second clutch partner as a slider sleeve carrier.

The clutch assembly has a slider sleeve arranged coaxially with respect to the two clutch partners. The slider sleeve may be displaceable in the axial direction with respect to the axis of rotation relative to the two clutch partners and is or can be connected to the first and/or second clutch partner in a rotationally fixed manner in the circumferential direction. The two clutch partners may be received radially within the slider sleeve. The clutch assembly may be designed as a disconnect clutch. Optionally, the slider sleeve can have a groove running in the rotational direction on its outer circumference for connecting an actuator. The groove may be used to receive a shift fork, e.g., to receive a sliding block.

The clutch assembly has a plurality of control members for controlling a coupling device. The coupling device is suitable and/or designed to couple the first and second clutch partners. The coupling device may be designed to connect the first and second clutch partners to one another in a rotationally fixed manner or to decouple them rotationally with respect to the coupling device. Alternatively or additionally, the coupling device can be designed to connect the two clutch partners to one another in a frictionally engaged and/or frictional manner or to decouple them with respect to the coupling device. The control members may be distributed, e.g., regularly, in the rotational direction around the main rotational axis. The control members are actuated by the slider sleeve. The control members may be actuated directly by the slider sleeve and/or can be in or can be placed in physical contact. The control members may be actuated by an axial displacement of the slider sleeve.

The control members may be arranged radially on the inside of the slider sleeve in at least one operating state of the clutch assembly. In addition, the control members are arranged so as to be displaceable in the radial direction to the main rotational axis. The control members may be displaced in the radial direction in order to control the coupling device. The control members may be actuated by the slider sleeve and thus displaced in the radial direction. The control members may be actuated by the slider sleeve in that the slider sleeve displaces the control members radially inwards.

The combination of the slider sleeve and the control members may create an exceptionally compact control system for a coupling device, which is integrated, for example, in the clutch assembly. The control members are arranged inside the slider sleeve so that they do not take up any additional installation space. Due to the control direction in the radial direction, no axial installation space is required for the control members. Despite the compact design, the coupling device can be controlled thereby, resulting in a compact clutch assembly with extended functions for a vehicle.

In an example embodiment, the slider sleeve has control contours on the inner circumference, the control contours extending in the axial direction to the main rotational axis and/or in the same direction to the main rotational axis. The control contours are designed, for example, as grooves. In axial extension, i.e., in the running direction of the control contours, the control contours have a radial height profile. The height profile may form control regions with different heights and/or diameters. The control members run or move along the control contours and thus along the radial height profile, e.g., at least in sections, in contact with one another during an axial movement of the slider sleeve, the control members being displaced by the radial height profile in the radial direction and thereby actuated.

The control members may be designed as control bolts, with a longitudinal extension of the control bolts being oriented in the radial direction to the main rotational axis, and the control members being displaceable along the longitudinal extension. The control members may be arranged in through-openings in one of the clutch partners.

In an example embodiment, the first clutch partner and the second clutch partner together with the slider sleeve form an interlocking clutch. These may form a dog clutch. In this embodiment, the slider sleeve can assume a locking position in order to connect the two clutch partners to one another in a rotationally fixed manner via the slider sleeve. Alternatively, the slider sleeve can assume an open position, with the clutch partners being rotationally decoupled with respect to the slider sleeve.

Alternatively or additionally, the clutch assembly includes the coupling device, and the coupling device can assume at least a first and a second control state, the coupling state of the clutch partners differing in the first and the second control state. The control states are controlled via the control members by the slider sleeve. This embodiment once again underlines the concept of proposing a compact coupling device with extended functions, namely the possibility of a locking position and an open position of the slider sleeve and at least a first and a second control state of the coupling device.

In a further embodiment, the first clutch partner has an external toothing and the second clutch partner has a locking toothing. The slider sleeve is in rotationally fixed engagement with the external toothing via an internal toothing, and the internal toothing can also be brought into rotationally fixed engagement with the locking toothing when slider sleeve is displaced into the locking position in order to couple the two clutch partners to one another in a rotationally fixed manner. The external toothing, the internal toothing and the locking toothing are each designed as a straight-cut toothing oriented in the axial direction with respect to the main rotational axis, such that the slider sleeve and the first or second clutch partner are displaceable relative to one another in the axial direction with respect to the main rotational axis and are coupled to one another in a rotationally fixed manner in the rotational direction. For example, at least the internal toothing of the slider sleeve and the external toothing of the first clutch partner may be formed by ridges or teeth or grooves that extend axially with respect to the main rotational axis. The slider sleeve may have a roof-like toothing axially on the side of the internal toothing directed towards the second clutch partner. Alternatively or optionally additionally, the second clutch partner has a roof-like toothing axially on the side of the locking toothing directed towards the slider sleeve. By axially displacing the slider sleeve into the open position, the rotationally fixed connection between the two freewheel partners with respect to the slider sleeve is canceled and/or the interlocking clutch is opened.

The control members may be formed in the first clutch partner, since the external toothing of the first clutch partner may be wider in the axial direction than the locking toothing of the first clutch partner. The through-openings for the control members in the first clutch partner may extend in such a way that they penetrate the external toothing. The control contours may run in the same direction as the internal toothing and/or form a recess in the circumferential internal toothing of the slider sleeve.

In an example implementation, the clutch assembly includes the clutch device, and the coupling device is designed as a switchable freewheel device. The clutch partners form freewheel partners in the freewheel device. The freewheel device is arranged between the first clutch partner and the second clutch partner in order to couple the two clutch partners as freewheel partners to one another according to the rotational direction and/or according to the rotational speed. For example, the freewheel device may realize a freewheel clutch and/or an overrunning clutch. The freewheel device is designed to be switchable, and the freewheel device can be connected as a first control state and disconnected as a second control state via the control members. For example, the control members can be brought into a connected position by the slider sleeve, and the freewheel device is connected as the first control state. In addition, the control members can be brought into a disconnected position by the slider sleeve, in which the freewheel device is disconnected as the second control state. In the connected state of the freewheel device, the freewheel device can assume a locked state in one rotational direction, and the freewheel device can transmit a torque for this rotational direction. The freewheel device can assume a freewheeling state, wherein the freewheel device is free-running, e.g., in an opposite rotational direction counter to the rotational direction. In the disconnected state of the freewheel device, the clutch partners are rotationally decoupled from each other as freewheel partners with respect to the freewheel device.

In an example embodiment, the freewheel device has a plurality of spring-loaded locking bodies which are arranged, e.g., fixed, on the one clutch partner and in a spring-loaded active position can interact interlockingly with a ramp-like locking contour arranged on the other clutch partner according to the rotational direction and/or according to the rotational speed. The locking contour may be formed by a circumferential toothed ramp geometry, e.g., a sawtooth ramp. The tooth ramps are oriented, for example, in the radial direction.

The locking bodies each have a locking section, and when the locking body is pivoted in a first pivot direction about a pivot axis running parallel to the main rotational axis into the active position, the locking section is deflected in the radial direction. When the freewheel device is in the locked state, the locking sections engage e.g., interlockingly, in the locking contour in a fixed rotational direction, and in a freewheeling state slide along the locking contour in an opposite rotational direction counter to the rotational direction. In the connected position of the control members, the locking bodies are in the active position so that the freewheel device is connected.

The locking bodies each have a deactivation section, and in the disconnected position of the control members the control members press on the deactivation sections. In this case, the locking bodies are pivoted in a second pivot direction about the respective pivot axes into a passive position, wherein in the passive position the locking section is, for example, permanently disengaged from the locking contour and the freewheel device is disconnected.

In an example embodiment, the locking body has a pivoting section, with the pivoting section forming the pivot axis, and the locking section is arranged opposite the deactivation section with respect to the pivoting section. The locking body may be designed with two wings, one wing being formed by the locking section and the other wing being formed by the deactivation section. Alternatively or additionally, the locking body is designed as a rocker, and the pivoting section with the pivot axis forms the rocker axis, the locking section forms the one rocker arm and the deactivation section forms the other rocker arm. This structural design allows the locking function and the activation function of the locking body to be implemented particularly compactly.

For the spring loading, the freewheel device may have a plurality of spring devices, with the spring devices each acting on the locking section and prestressing the locking body, e.g., the locking section, in the first pivot direction and/or against the locking contour.

In an example implementation, the locking bodies are arranged radially on the outside with respect to the locking contour. In this case, the locking sections are prestressed radially inwards, e.g., the spring devices press the locking sections radially inwards. The locking members pivot the locking bodies in such a way that the locking sections are pivoted radially outwards.

The locking members may be prestressed radially outward, for example with a spring or via the spring device of the locking sections, such that they press elastically against the slider sleeve, e.g., the control contours. Thus, the locking members are positioned in the connected position in a spring-loaded manner and are moved radially inwards by the slider sleeve, e.g., the control contours, against the spring load and/or the prestressing into the disconnected position in order to press on the deactivation section and bring the locking body into the passive position.

The slider sleeve is displaceable in the axial direction with respect to the main rotational axis between a locking position, a freewheeling position and a neutral position. The slider sleeve may be displaceable in an axial direction in relation to the main rotational axis from the locking position to the freewheeling position and then to the neutral position and in reverse order in an opposite axial direction.

In the locking position, the two clutch partners are connected to one another in a rotationally fixed manner in one rotational direction and in an opposite rotational direction via the slider sleeve. In the locking position, the slider sleeve may be engaged interlockingly with the first clutch partner and the second clutch partner in the circumferential direction in order to connect the two clutch partners to one another in a rotationally fixed manner during rotation in the rotational direction and the opposite rotational direction. By axially displacing the slider sleeve into the freewheeling position as the open position of the slider sleeve, the rotationally fixed connection between the two clutch partners is at least partially canceled and/or the interlocking clutch is opened.

In the freewheeling position, the two freewheel partners are connected to one another in a rotationally fixed manner via the freewheel device in precisely one rotational direction. The slider sleeve controls the active position of the locking bodies. In the freewheeling position, the locking bodies may be engaged interlockingly with the first clutch partner and the second clutch partner in the rotational direction in order to connect the two clutch partners to one another in a rotationally fixed manner during rotation in the rotational direction. In contrast, the two clutch partners can be rotated relative to one another during rotation in an opposite rotational direction or one of the two clutch partners remains stationary. By axially displacing the slider sleeve into the neutral position as a further open position of the slider sleeve, the freewheel device is disconnected.

In the neutral position, the locking bodies are kept disengaged with respect to the locking contour by controlling the locking bodies into the passive position, such that the two clutch partners can be rotated relative to one another in the rotational direction and in the opposite rotational direction. By axially displacing the slider sleeve into the neutral position, the rotationally fixed connection between the two clutch partners is completely canceled.

The disclosure may further relate to a drive train including a first and a second shaft and including the clutch assembly as already described above. The first shaft is connected to the first clutch partner in a rotationally fixed manner and the second shaft is connected to the second clutch partner in a rotationally fixed manner, and torque transmission between the two shafts can be controlled by axially displacing the slider sleeve of the clutch assembly. The first clutch partner may have a first driving toothing for the rotationally fixed connection of the first shaft, and the second clutch partner may have a second driving toothing for the rotationally fixed connection of the second shaft. The drive train may be designed and/or suitable for driving a vehicle, e.g., a motor vehicle. The drive train may be designed and/or is suitable for an electric axle of the vehicle. The clutch assembly can be part of a connect or disconnect unit, for example to release an electric drive from the drive shafts of the vehicle. For this purpose, one shaft can be designed as a motor-side drive shaft and the other shaft as a wheel-side output shaft.

BRIEF DESCRIPTION OF THE DRAWINGS

Further features, advantages and effects of the disclosure arise from the following description of exemplary embodiments. In the drawings.

DETAILED DESCRIPTION

Figure 1:
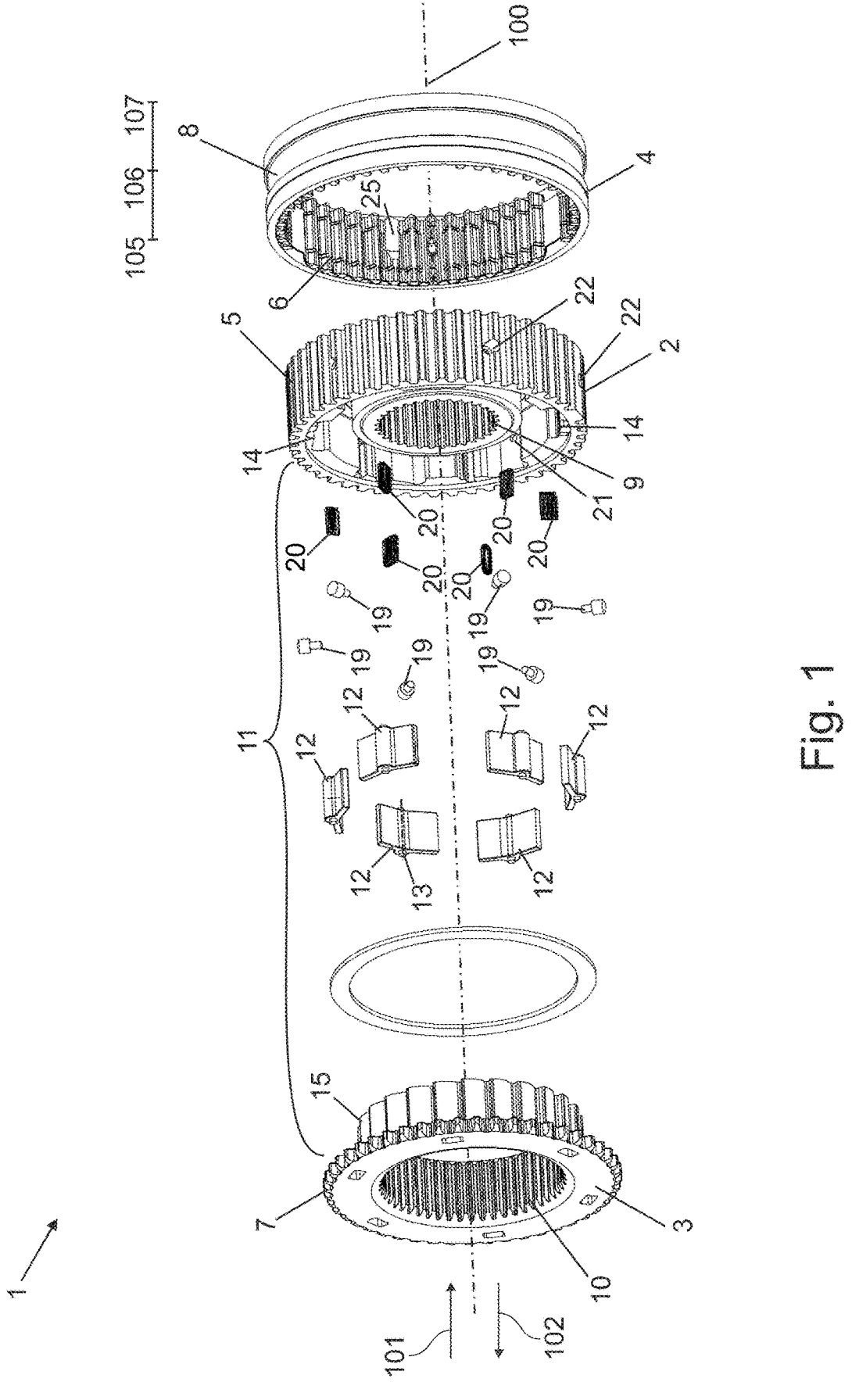
FIG. 1 shows an exploded view of a clutch assembly as an exemplary embodiment.

FIG. 1 shows a clutch assembly 1 in an exploded view as an exemplary embodiment. The clutch assembly 1 is designed as a dog clutch and/or interlocking clutch, wherein the clutch assembly has a first and a second clutch partner 2, 3 and a slider sleeve 4, which are arranged coaxially with respect to one another in relation to a common main rotational axis 100.

The first clutch partner 2 is designed as a hub, e.g., a sleeve carrier, on which the slider sleeve 4 is arranged in a rotationally fixed manner and is arranged to be displaceable in an axial direction 101 and an opposite axial direction 102 with respect to the main rotational axis 100. For this purpose, the first clutch partner 2 has an external toothing 5 on the outer circumference, and the slider sleeve 4 has an internal toothing 6 on the inner circumference, which are each designed as a straight-cut toothing extending axially with respect to the main rotational axis 100.

The second clutch partner 3 is designed as a clutch body which has a locking toothing 7 on its outer circumference, wherein the slider sleeve 4 can be brought into rotationally fixed engagement with the locking toothing 7 during an axial displacement in the opposite axial direction 102 along the main rotational axis 100 in order to couple the two clutch partners 2, 3 to one another in a rotationally fixed manner. For example, the first and second clutch partners 2, 3 are each designed as a spur gear or a spur-toothed gear.

The slider sleeve 4 can be connected to an actuator (not shown), which applies an actuating force to the slider sleeve 4 in the axial direction with respect to the main rotational axis 100. In order to displace the slider sleeve 4 in the axial direction 101 or the opposite axial direction 102 during a rotation about the main rotational axis 100, the slider sleeve 4 has a circumferential groove 8 on its outer circumference, into which, for example, a shift fork of the actuator can engage.

The first and second clutch partners 2, 3 are each connected in a rotationally fixed manner to a respective rotating component, for example a shaft. For this purpose, the first clutch partner 2 has a first driving toothing 9 on the inner circumference and the second clutch partner 3 has a second driving toothing 10 on the inner circumference. The first and second driving toothings 9, 10 are each designed as a spline. For example, the first clutch partner 2 can be arranged on an output side and the second clutch partner 3 can be arranged on a drive side.

The clutch assembly 1 also includes a switchable freewheel device 11 as a coupling device, wherein the clutch partners 2, 3 each form freewheel partners of the freewheel device 11. The freewheel device 11 has a plurality of, e.g., six, locking bodies 12 distributed around the main rotational axis 100, each of which is pivotably arranged in a receiving pocket 14 formed on the first clutch partner 2 as a freewheel partner. The receiving pockets 14 are each designed as depressions introduced on the inner circumference of the first clutch partner 2, which substantially form a negative contour of the locking bodies 12. The locking bodies 12 can be deflected in the radial direction and are received interlockingly in the circumferential direction in the associated receiving pocket 14. For radial deflection, the locking bodies 12 can each be pivoted about a pivot axis 13, the pivot axes 13 being oriented parallel to the main rotational axis.

Figure 3A:
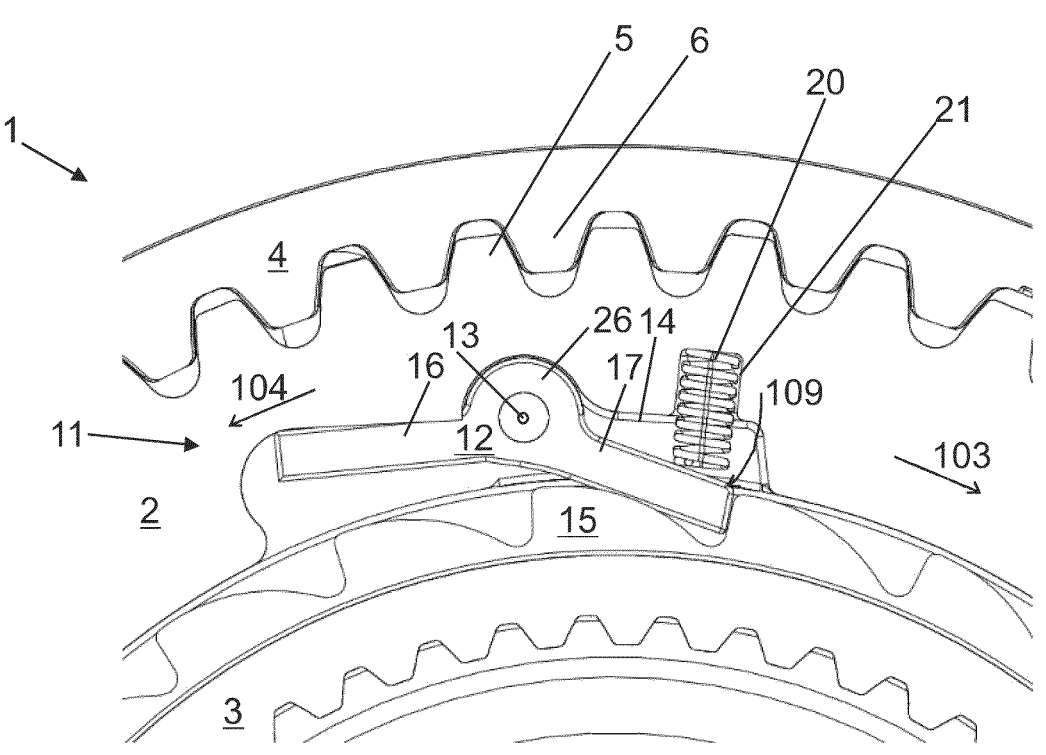
FIGS. 3a and 3b show axial views of the clutch assembly from FIG. 1 in the region of a freewheel device as a coupling device.

The second clutch partner 3, as a freewheel partner, has a ramp-like locking contour 15 on its outer circumference facing the locking bodies 12, which locking contour is designed as a spur toothing. The locking contour 15 can interact interlockingly with the locking bodies 12 in a connected state of the freewheel device 11 in a rotational direction 103 (ref. FIG. 3a) of the second clutch partner 3. In an opposite rotational direction 104 that is directed counter to the rotational direction 103, the first and the second clutch partners 2, 3 can be rotated relative to one another, with the locking bodies 14 sliding on the locking contour 15 when the freewheel device 11 is in the connected state. The locking bodies 12 are designed as locking double pawls and the locking contour 15 is formed by a plurality of sawtooth ramps rising in the circumferential direction.

The slider sleeve 4 can be displaced along the main rotational axis 100 into a locking position 105, a freewheeling position 106 as a first open position and a neutral position 107 as a second open position. In the locking position 105, the slider sleeve 4 is engaged via the internal toothing 6, on the one hand, with the external toothing 5 and, on the other hand, with the locking toothing 7, such that the two clutch partners 3, 4 are connected to one another in a rotationally fixed manner in the rotational direction 103 and the opposite rotational direction 104. In the freewheeling position 106, the slider sleeve 4 is engaged exclusively with the external toothing 5 via the internal toothing 6, such that the slider sleeve 4 assumes the open position. However, the freewheel device 11 is connected, such that the two clutch partners 3, 4 are connected and/or connectable to one another in a rotationally fixed manner in the rotational direction 103 and are rotatable relative to one another in the opposite rotational direction 104. In the neutral position 107, the slider sleeve 4 is engaged exclusively with the external toothing 5 via the internal toothing 6, such that the slider sleeve 4 assumes the second open position. At the same time, the freewheel device 11 is disconnected, such that the two clutch partners 3, 4 can be rotated relative to one another in the rotational direction 103 and in the opposite rotational direction 104.

Figure 2:
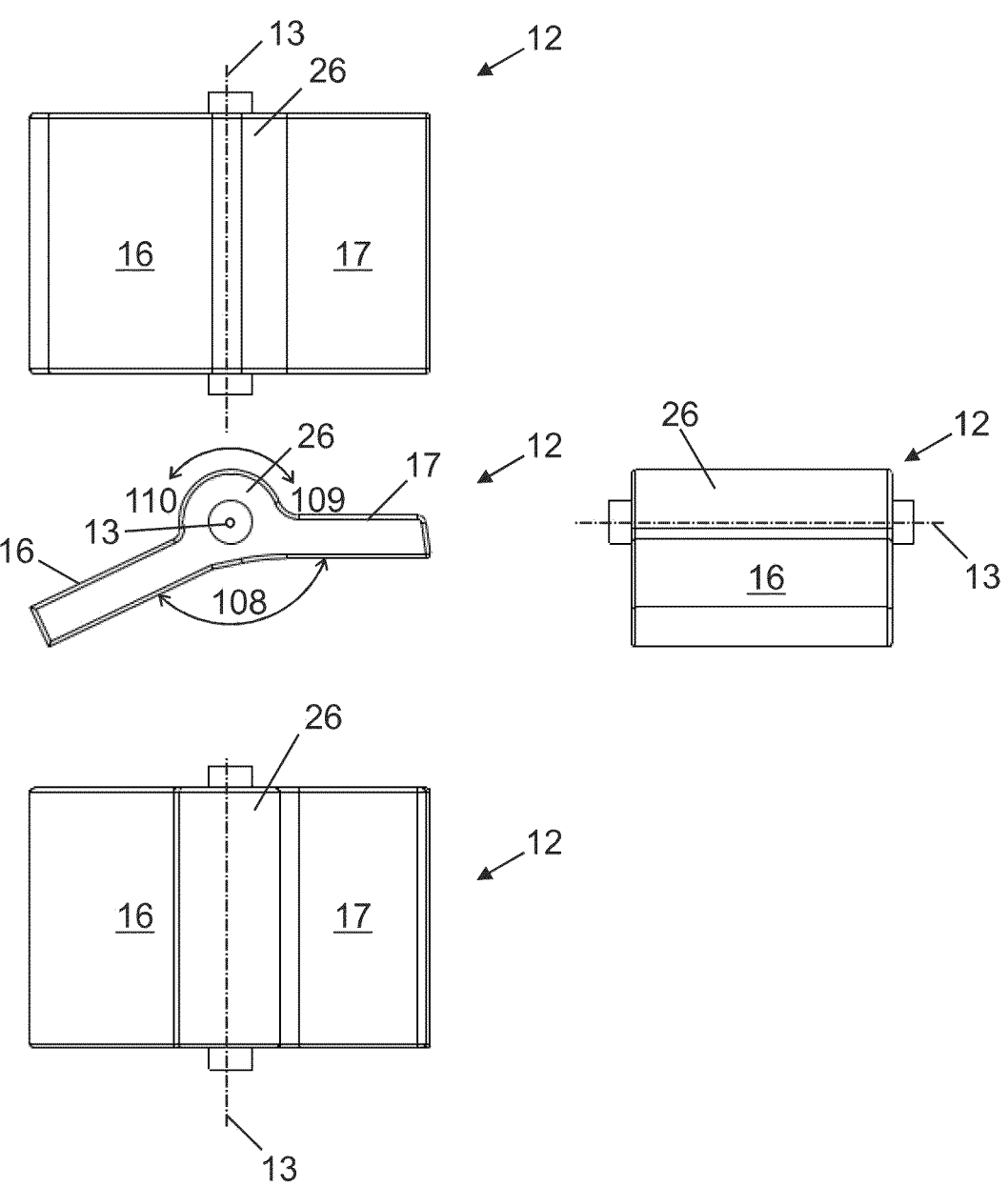
FIG. 2 shows various views of a locking body in the clutch assembly from FIG. 1.

FIG. 2 shows the locking body 12 in different views. The locking body 12 is designed as double-leaf and/or as a double-pawl body and/or as a rocker body. The locking body 12 has a central and/or middle pivoting section 26 with the pivot axis 13, a deactivation section 16 arranged on the one side of the pivoting section 26, and, for example, a locking section 17 arranged opposite on the other side. In a radial plan view from the inside and/or in a radial plan view from the outside, the deactivation section 16 and the locking section 17 are each formed as a rectangular section, which are connected to one another and to the pivoting section 26 in one piece at an intermediate angle 108 in the region of the pivoting section 26. The intermediate angle 108 is smaller than 180° on the radial inner side and approximates the pitch circle radius around the main rotational axis 100.

Upon closer inspection, it can be seen that, in the cross-section shown, the longitudinal extension in the rotational direction of the locking body 12 is longer in the deactivation section 16 than in the locking section 17. As becomes apparent from the following description, the locking section 17 serves to achieve an interlocking connection between the locking contour 15 and the receiving pocket 14, such that the locking section 17 is mechanically stable and thus shortened compared to the deactivation section 16. The deactivation section 16 serves to control the pivoting of the locking body 12 about the pivot axis 13 and can therefore be mechanically less stable. In addition, the longer lever of the deactivation section 16 reduces the forces required to pivot the locking body 12.

On the radial outer side, the pivoting section 26 has a circular outer contour in the cross-section shown, which is arranged coaxially with respect to the pivot axis 13. With the pivoting section 26, the locking body 12 is pivotable about the pivot axis 13 in the receiving pocket 14. The locking body 12 can be pivoted about a first pivot direction 109 so that the locking section 17 can be brought into an active position and, when pivoted about a second pivot direction 110 which is counter to the first pivot direction 109, the locking body 12 can be brought into a passive position.

Figure 3B:
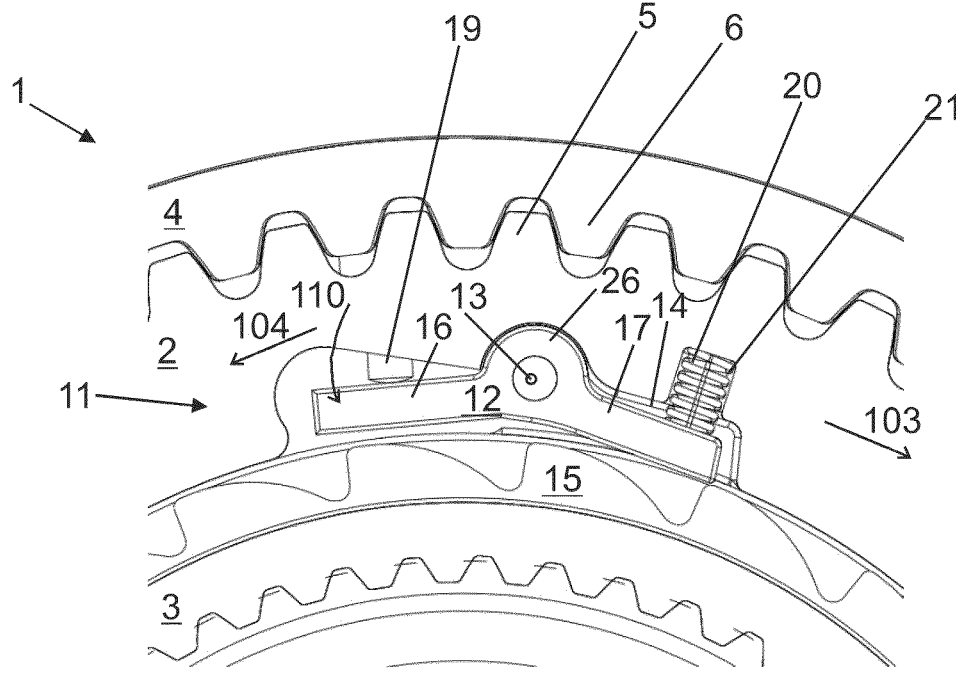

FIGS. 3a and 3b show a schematic axial plan view of the clutch assembly 1, and in FIG. 3a the freewheel device 11 is connected and in FIG. 3b the freewheel device 11 is disconnected.

As can be seen in particular in an overall with FIG. 1, the clutch assembly 1 has a plurality of control members 19 and a plurality of spring devices 20. Each of the locking bodies 12 is assigned a control member 19 and a spring device 20. The spring device 20 is supported in a manner received in a blind hole 21 in the radial direction against the first clutch body 2 and presses on the radial outer side of the locking section 17 of the locking body 12, as can be seen in particular from FIG. 3a. Due to the prestressing, the locking body 12 is spring-loaded and presses the locking section 17 in the first pivot direction into the locking contour 15 so that the freewheel 11 is connected. When the first clutch body 2 rotates in the rotational direction 103, an interlocking connection can be established between the locking contour 15 via the locking section 17, the pivoting section 26 and the receiving pocket 14 to the first clutch body 2. In the opposite rotational direction 104, the locking section 17 slides over the locking contour 15.

Figure 4:
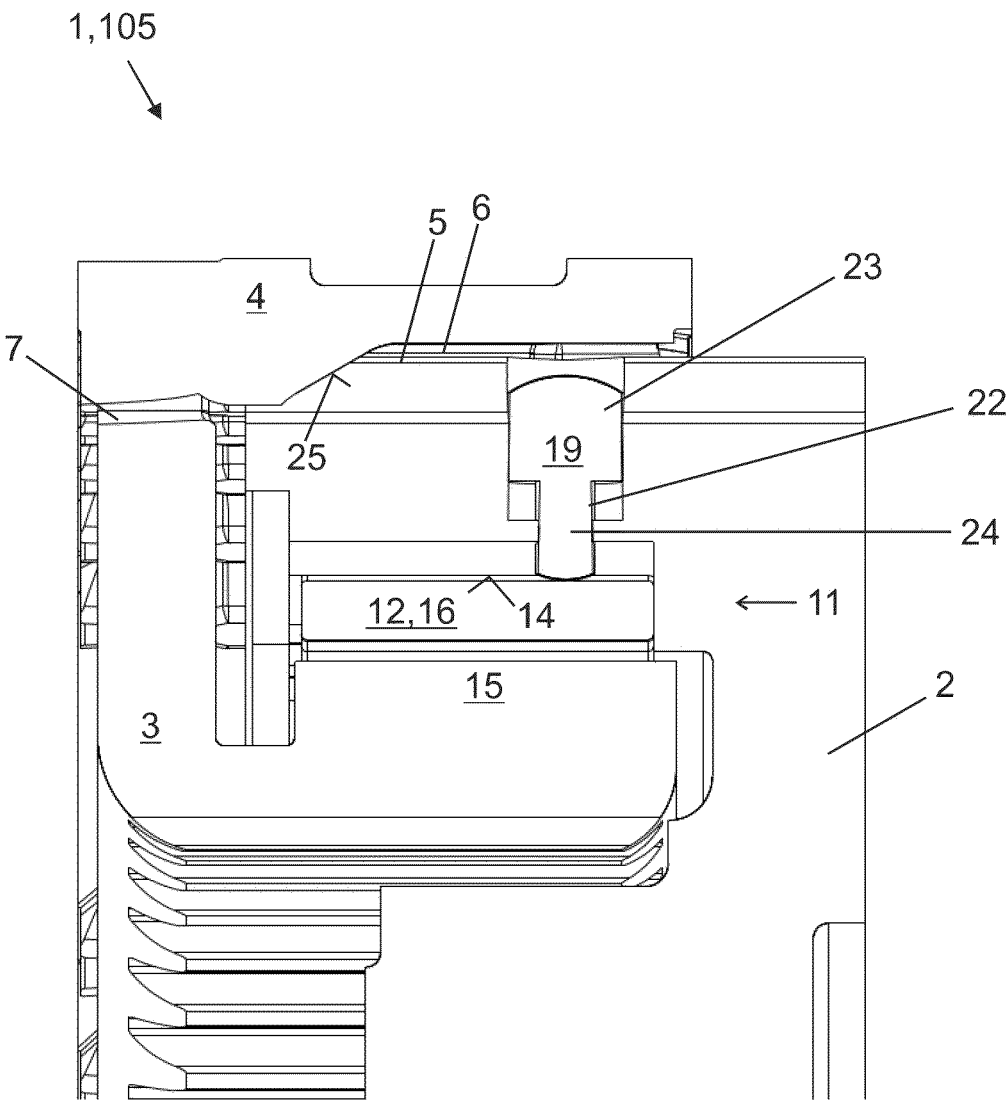
FIG. 4 shows a schematic longitudinal sectional view of the clutch assembly from the preceding figures with a slider sleeve in a locking position.

The control members 19 are designed as control bolts and are arranged so as to be displaceable in the radial direction in stepped bores 22 (ref. FIG. 4) as through-openings, which are introduced in the radial direction to the main rotational axis in the first clutch body 2. The control members 19 are in a connected position in FIG. 3a, in which they are separated from the locking bodies 12 or rest only weakly on the deactivation section 16.

In FIG. 3b, the control members 19 are in a disconnected position and are displaced radially inwards relative to the connected position. In the disconnected position, the control members 19 press on the radial outer side of the deactivation section 16 of the locking body 12 so that the locking body 12 is pivoted about the pivot axis 13 in the second pivot direction 110 and the locking section 17 is disengaged from the locking contour 15 against the spring force of the spring device 20. Thus, the first and second clutch bodies 2, 3 are decoupled in both rotational directions 103, 104 with respect to the freewheel 11.

In FIG. 4, the clutch assembly 1 is shown in the locking position 105, and in a longitudinal section through one of the control members 19. The slider sleeve 4 engages over the first clutch partner 2 and the second clutch partner 3, with the internal toothing 6 of the slider sleeve 4 being in engagement with both the external toothing 5 of the first clutch partner 2 and the locking toothing 7 of the second clutch partner 3, such that they are connected to one another in a rotationally fixed manner via the slider sleeve 4.

In the longitudinal section it can be seen that the control member 19 has a bolt head 23 and a bolt shaft 24, and the bolt shaft 24 is guided through the stepped bore 22 up to the locking body 12 and rests on the latter. In the illustration shown, the control member 19 thus rests weakly on the deactivation section 16 of the locking body 12. The slider sleeve 4 has a control contour 25 which runs in the axial direction to the main rotational axis 100 and which, in the shown locking position 105 of the slider sleeve 4, is arranged at a distance and/or separate from the control member 19. The control member 19 is in the connected position and does not transmit any force to the deactivation section 16 of the locking body 12, such that the freewheel 11 is engaged and the locking section 17 is in the active position, as shown and explained in FIG. 3a.

Figure 5:
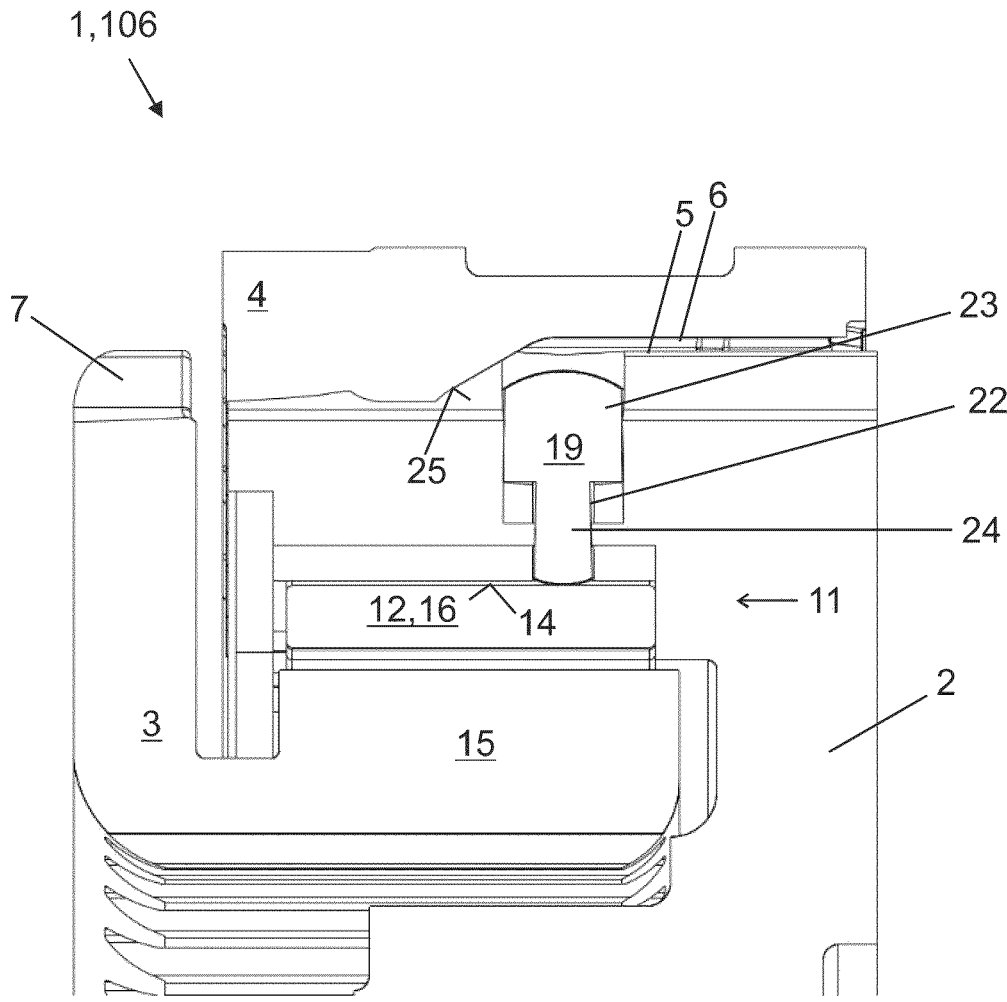
FIG. 5 shows a schematic longitudinal sectional view of the clutch assembly from the preceding figures with the slider sleeve in a freewheeling position/open position.

In FIG. 5, the clutch assembly 1 is shown in the same representation, but in the freewheeling position 106. The slider sleeve 4 is displaced so far that the second clutch partner 3 and/or the locking toothing 7 is/are released and is thus in the first open position. As a result, the interlocking connection between the first and the second clutch partners 2, 3 is released via the slider sleeve 4. The control contour 25 is still arranged at a distance and/or without contact and/or without effect with respect to the control member 19 so that the latter remains in the connected position. Thus, the locking section 17 is in the active position, as shown and explained in FIG. 3a. Consequently, the freewheel 11 is activated/connected and a torque is transmitted between the clutch partners 2, 3 according to the rotational direction.

Figure 6:
FIG. 6 shows a schematic longitudinal sectional view of the clutch assembly from the preceding figures with the slider sleeve in a neutral position/open position.
Figure 6:
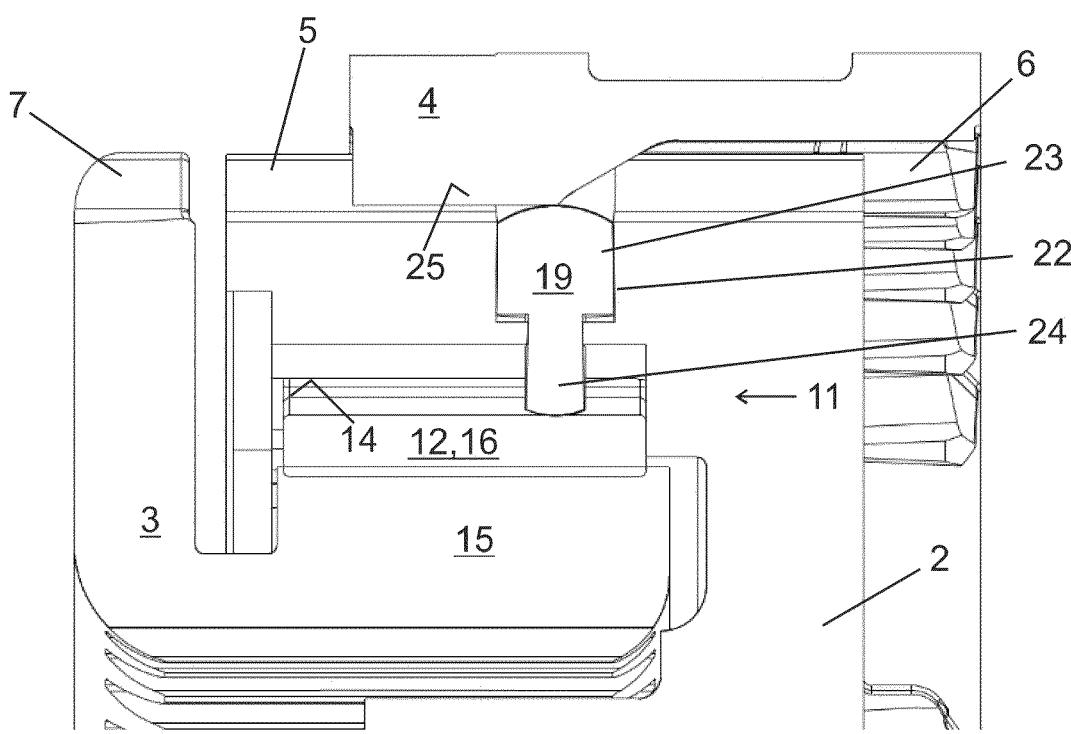

In FIG. 6, the clutch assembly 1 is shown as in the previous figures, but in the neutral position 107 as a second open position. By further axially displacing the slider sleeve 4 in the axial direction 101, the control contour 25 contacts the control member 19. The control contour 25 has a diameter reduction in its axial course as a radial height profile, e.g., in the form of a ramp, so, during the transition to the neutral position 107, the control contours 25 contact the control members 19 and transfer in the radial direction from the connected position to the disconnected position. By transferring from the connected position to the disconnected position, the control member 19 is displaced in the radial direction and presses on the deactivation section 16 of the locking body 12. As a result, as shown and described in FIG. 3b, the control body 12 is pivoted about the pivot axis 13 in the second pivot direction 110 so that the locking section 17 of the locking body 12 is transferred from the active position to the passive position. As a result, the freewheel 11 is disconnected in the neutral position 107, such that the clutch partners 2, 3 can rotate completely independently of each other.

REFERENCE NUMERALS

1 Clutch assembly
2 First clutch partner
3 Second clutch partner
4 Slider sleeve
5 External toothing
6 Internal toothing
7 Locking toothing
8 Groove
9 First driving toothing
10 Second driving toothing
11 Freewheel device
12 Locking body
13 Pivot axis
14 Receiving pocket
15 Locking contour
16 Deactivation section
17 Locking section
19 Control members
20 Spring devices
21 Blind hole
22 Stepped bores
23 Bolt head
24 Bolt shaft
25 Control contour
26 Pivoting section
100 Main rotational axis
103 Rotational direction
104 Opposite rotational direction
105 Locking position
106 Freewheeling position
107 Neutral position
108 Intermediate angle
109 First pivot direction
110 Second pivot direction

The invention claimed is:

1. A clutch assembly, comprising:
a first clutch partner and a second clutch partner, the clutch partners defining a main rotational axis,
a slider sleeve arranged so as to be displaceable coaxially with respect to the two clutch partners, and
a plurality of control members for controlling a coupling device for coupling the clutch partners, the control members being actuated by the slider sleeve, wherein:
the control members are arranged radially on the inside with respect to the slider sleeve and are arranged so as to be displaceable in the radial direction to the main rotational axis;
the first clutch partner has an external toothing and the second clutch partner has a locking toothing;
the slider sleeve is in rotationally fixed engagement with the external toothing via an internal toothing; and
the internal toothing can also be brought into rotationally fixed engagement with the locking toothing when the slider sleeve is displaced in order to couple the two clutch partners to one another in a rotationally fixed manner.

2. The clutch assembly according to claim 1, wherein the slider sleeve has control contours on the inner circumference, wherein the control contours have a radial height profile in axial extension, wherein the control members run along the control contours during an axial movement of the slider sleeve and are displaced in the radial direction by the radial height profile and are thereby actuated.

3. The clutch assembly according to claim 1, wherein the coupling device is designed as a switchable freewheel device of the clutch assembly, wherein the clutch partners in the freewheel device form freewheel partners, wherein the control members can be brought into a connected position by the slider sleeve, wherein the freewheel device is connected, wherein the freewheel device can assume a locked state and a freewheeling state according to the rotational direction or the rotational speed of the clutch partners as freewheel partners, and wherein the control members can be brought into a disconnected position by the slider sleeve, wherein the freewheel device is disconnected, wherein the clutch partners as freewheel partners are rotationally decoupled from one another with respect to the freewheel device.

4. The clutch assembly according to claim 3, wherein the freewheel device has a plurality of spring-loaded locking bodies which are arranged on one of the clutch partners as a freewheel partners, wherein the locking bodies each have a locking section, wherein when the locking body is pivoted in a first pivot direction about a pivot axis running parallel to the main rotational axis into an active position, the locking section can be deflected in the radial direction and interacts interlockingly with a ramp-like locking contour arranged on the other one of the clutch partners as a freewheel partner according to the rotational direction, and wherein the locking bodies each have a deactivation section, wherein in the connected position of the control members the locking bodies are in the active position and the freewheel device is connected, and wherein in the disconnected position of the control members the control members press on the deactivation sections in order to pivot the locking bodies in a second pivot direction about the pivot axis into a passive position, wherein in the passive position the locking section is disengaged from the locking contour and the freewheel device is disconnected.

5. The clutch assembly according to claim 4, wherein the locking bodies have a pivoting section, wherein the pivoting section forms the pivot axis, wherein with respect to the pivoting section the locking section is arranged opposite the deactivation section.

6. The clutch assembly according to claim 4, wherein the freewheel device has a plurality of spring devices, wherein the spring devices act on the locking sections and prestress the locking bodies in the first pivot direction.

7. The clutch assembly according to claim 4, wherein the locking bodies are arranged on the first clutch partner as freewheel partners and the locking contour is arranged on the second clutch partner as a freewheel partner, wherein the locking bodies are arranged radially on the outside of the locking contour, wherein the control members are arranged radially displaceably in the first clutch partner as a freewheel partner in order to switch between the connected position and the disconnected position.

8. A drive train, comprising:
a first shaft;
a second shaft; and the clutch assembly according to claim 1, wherein;
the first shaft is connected in a rotationally fixed manner to the first clutch partner and the second shaft is connected in a rotationally fixed manner to the second clutch partner; and
torque transmission between the two shafts can be controlled by axially displacing the slider sleeve of the clutch assembly.

9. A clutch assembly comprising:
a main rotational axis;
a first clutch partner and a second clutch partner;
a plurality of control members arranged to control a coupling device, the coupling device arranged to couple the first clutch partner and the second clutch partner; and
a slider sleeve, coaxially displaceable with respect to the first clutch partner and the second clutch partner to actuate the plurality of control members, wherein:
the plurality of control members is arranged on a radial inside of the slider sleeve and displaceable in a radial direction relative to the main rotational axis, wherein:
the first clutch partner comprises an external toothing;
the second clutch partner comprises a locking toothing;
the slider sleeve comprises an internal toothing in rotationally fixed engagement with the external toothing; and
when the slider sleeve is displaced, the internal toothing is arranged to be brought into rotationally fixed engagement with the locking toothing to couple the first clutch partner to the second clutch partner in a rotationally fixed manner.

10. The clutch assembly of claim 9, wherein:
the slider sleeve comprises an inner circumference with a plurality of control contours, each of the plurality of control contours comprising a respective radial height profile in axial extension; and
each of the plurality of the control members:
runs along a respective one of the plurality of control contours during an axial movement of the slider sleeve; and
is actuated by displacement in the radial direction by the respective radial height profile.

11. The clutch assembly of claim 9, wherein:
the slider sleeve can assume a locking position connecting the first clutch partner to the second clutch partner in a rotationally fixed manner; and
the slider sleeve can assume an open position wherein:
the first clutch partner is rotatable relative to the second clutch partner; or
the first clutch partner, the second clutch partner, and the slider sleeve form an interlocking clutch.

12. The clutch assembly of claim 9, further comprising the coupling device, wherein the coupling device can assume a first control state and a second control state, controlled by the plurality of control members.

13. The clutch assembly of claim 9, wherein:
the coupling device is designed as a switchable freewheel device;
the first clutch partner is a first freewheel clutch partner;
the second clutch partner is a second freewheel clutch partner;
the slider sleeve is arranged to bring the plurality of control members into a connected position to connect the switchable freewheel device so that the switchable freewheel device can assume a locked state or a freewheeling state depending on a rotational direction or a rotational speed of the first freewheel clutch partner and the second freewheel clutch partner; and the slider sleeve is arranged to bring the plurality of control members into a disconnected position to disconnect the switchable freewheel device so that the first freewheel clutch partner and the second freewheel clutch partner are rotationally decoupled from one another.

14. The clutch assembly of claim 13, wherein:

the switchable freewheel device comprises a plurality of spring-loaded locking bodies arranged on the first freewheel clutch partner, each of the plurality of spring-loaded locking bodies comprising a locking section and a deactivation section;

the second freewheel clutch partner comprises a plurality of ramp-like locking contours;

when the plurality of control members is in the connected position:

each of the plurality of spring-loaded locking bodies is pivoted in a first pivot direction about a pivot axis running parallel to the main rotational axis into an active position;

the switchable freewheel device is engaged; and, when the first freewheel clutch partner is rotated relative to the second freewheel clutch partner in a first rotational direction, each locking section is radially deflected to interlock with a one of the plurality of ramp-like locking contours; and when the plurality of control members is in the disconnected position:

the plurality of control members press on respective deactivation sections to pivot the respective locking bodies in a second pivot direction, opposite the first pivot direction, into a passive position in which the respective locking sections are disengaged from the ramp-like locking contours; and the switchable freewheel device is disengaged.

15. The clutch assembly of claim 14, wherein:

each spring-loaded locking body comprises a pivoting section forming the pivot axis; and the locking section is arranged opposite the deactivation section with respect to the pivoting section.

16. The clutch assembly of claim 14, wherein the switchable freewheel device further comprises a plurality of spring devices, each acting on a respective locking section to prestress the respective spring-loaded locking body in the first pivot direction.

17. The clutch assembly of claim 14, wherein:

the plurality of spring-loaded locking bodies is arranged radially outside of the plurality of ramp-like locking contours; and the plurality of control members is arranged radially displaceably in the first freewheel clutch partner.

18. A clutch assembly comprising:

a main rotational axis;

a first freewheel clutch partner;

a second freewheel clutch partner comprising a plurality of ramp-like locking contours;

a switchable freewheel device arranged to couple the first freewheel clutch partner and the second freewheel clutch partner, the switchable freewheel device comprising a plurality of spring-loaded locking bodies arranged on the first freewheel clutch partner, each of the plurality of spring-loaded locking bodies comprising a locking section and a deactivation section;

a plurality of control members arranged on a radial inside of a slider sleeve and displaceable in a radial direction relative to the main rotational axis to control the switchable freewheel device; and the slider sleeve, coaxially displaceable with respect to the first freewheel clutch partner and the second freewheel clutch partner to:

bring the plurality of control members into a connected position to connect the switchable freewheel device so that the switchable freewheel device can assume a locked state or a freewheeling state depending on a rotational direction or a rotational speed of the first freewheel clutch partner and the second freewheel clutch partner; and bring the plurality of control members into a disconnected position to disconnect the switchable freewheel device so that the first freewheel clutch partner and the second freewheel clutch partner are rotationally decoupled from one another, wherein:

when the plurality of control members is in the connected position:

each of the plurality of spring-loaded locking bodies is pivoted in a first pivot direction about a pivot axis running parallel to the main rotational axis into an active position;

the switchable freewheel device is engaged; and, when the first freewheel clutch partner is rotated relative to the second freewheel clutch partner in a first rotational direction, each locking section is radially deflected to interlock with a one of the plurality of ramp-like locking contours; and when the plurality of control members is in the disconnected position:

the plurality of control members press on respective deactivation sections to pivot the respective locking bodies in a second pivot direction, opposite the first pivot direction, into a passive position in which the respective locking sections are disengaged from the ramp-like locking contours; and the switchable freewheel device is disengaged.

* * * * *